Sept. 20, 1932.  A. LESAGE  1,878,976
MOTORCYCLE
Filed Jan. 2, 1932
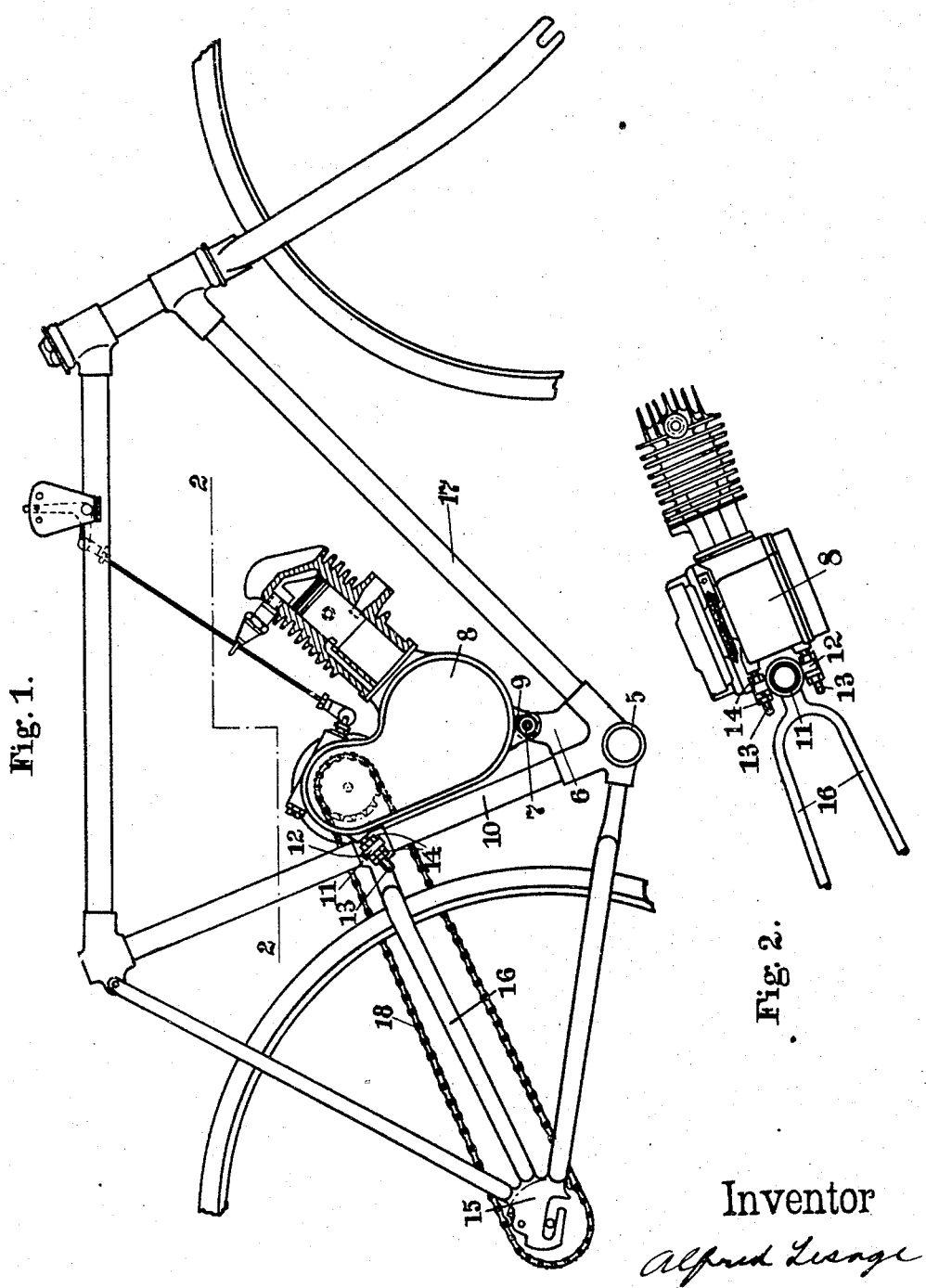

Patented Sept. 20, 1932

1,878,976

UNITED STATES PATENT OFFICE

ALFRED LESAGE, OF SCHWEINFURT IN BAVARIA, GERMANY

MOTORCYCLE

Application filed January 2, 1932, Serial No. 584,549, and in Germany January 16, 1930.

The invention refers to a motor cycle and the particular manner of mounting the motor in the cycle frame.

The object of the invention is the attachment of the motor to the frame in such a manner that the motor can easily be adjusted with respect to the tubes constituting the frame while the connecting device permits of its ready attachment or removal, if required.

This object is attained by giving the motor a contour similar to the angle formed by the two frame tubes which are fixed in the bracket of the crank axle bearing and by providing a lug upon the bracket between the said two tubes, upon which lug the motor is pivotally supported at its lower end, its upper end being adjustably connected with at least one of the said frame tubes.

An embodiment of the invention is illustrated, by way of example in the annexed drawing, which forms a part of this specification and in which—

Fig. 1 is a side elevation of a part of a bicycle with the motor shown, partly in section, in its operative position in the frame, and Fig. 2 is a top view of the motor and its attachment, partly in section, on the broken line 2—2 of Fig. 1.

Like numerals denote like parts in both figures of the drawing.

The frame of the bicycle of the ordinary type receives the motor within the acute angle formed by the saddle-supporting tube 10 and the lower frame tube 17. Projecting upwards from the bracket 5 of the crank axle bearing between the frame tubes 10 and 17 there is a lug 6 which may consist of one piece with the bracket 5 or be rigidly connected thereto by brazing. An apertured lug 9 preferably integral with the crank case of the motor 8 is pivoted to the lug 6 by means of a bolt 7, so that the motor may be swung or rocked about the axis of said bolt and in the plane of the frame.

Approximately in the middle of the saddle-supporting tube 10, a clip or collar 11 is fixed upon the said tube and provided with apertured lugs on either side through which extend screw threaded pins 13 connected to the upper part of the crank and change speed gear case 8. Nuts 14 adjustably screwed on pins 13 on both sides of the eyes 12 permit the pivotal movement and subsequent securing of the motor rigidly in the position in which the chain 18 transmitting the drive from the driving gear wheel of the motor to the rear wheel sprocket is tightened.

In order that the frame be reinforced, a fork 16 is inserted between the collar 11 and the end piece 15 of the rear fork of the cycle.

The above described mounting of the motor in the cycle frame has the advantage that the motor is in a reliable manner supported in the lower part of the frame and adjusted with its upper end. Moreover, the pedal driving gear is not impaired and remains unaltered.

What I claim as my invention is—

1. In a motor cycle, the combination with a frame, of a crank axle bracket forming part of the frame, a lug rigid with the bracket and projecting upwards between the adjacent frame tubes, a motor disposed in the frame and pivotally attached at its lower end to said lug, a collar disposed upon the frame, lateral lugs of the collar, screw threaded pins attached to the upper part of the motor and engaging the said lugs, and nuts screwed on said pins and adapted to adjust and immobilize the motor relatively to the frame.

2. In a motor cycle, the combination with a frame, of a crank axle bracket forming part of the frame, a lug rigid with the bracket and projecting between the frame, a motor disposed in the plane of the frame, a bolt pivotally attaching the lower end of the motor to said lug, a collar mounted on the saddle-supporting tube, means disposed between the collar and the upper part of the motor and adapted to adjust the motor in the plane of the frame, and an auxiliary fork interconnecting said collar with the rear end of the frame.

3. In a motor cycle, the combination with a frame including downwardly converging tubes and a crank axle bracket to which said tubes are secured, of a lug integral with and projecting upwardly from said bracket between said tubes, a motor having its lower end pivotally attached to said lug, and means for rigidly connecting the upper part of the motor to one of said frame tubes, said means permitting pivotal adjustments of the motor in opposite directions.

In testimony whereof I have signed my name to this specification.

ALFRED LESAGE.